(12) United States Patent
Winefordner et al.

(10) Patent No.: US 10,093,386 B2
(45) Date of Patent: Oct. 9, 2018

(54) BICYCLE PEDAL

(71) Applicant: Selle Royal S.p.A., Pozzoleone (Vicenza) (IT)

(72) Inventors: Carl Winefordner, Laguna Beach, CA (US); Frank Hermansen, Laguna Beach, CA (US); Mark Rane, Laguna Beach, CA (US)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 0 days.

(21) Appl. No.: 15/311,987

(22) PCT Filed: May 14, 2015

(86) PCT No.: PCT/IB2015/053566
§ 371 (c)(1),
(2) Date: Nov. 17, 2016

(87) PCT Pub. No.: WO2015/177693
PCT Pub. Date: Nov. 26, 2015

(65) Prior Publication Data
US 2017/0096188 A1 Apr. 6, 2017

(30) Foreign Application Priority Data

May 19, 2014 (IT) .................. VR20140137

(51) Int. Cl.
B62M 3/08 (2006.01)

(52) U.S. Cl.
CPC .............. *B62M 3/08* (2013.01); *B62M 3/086* (2013.01)

(58) Field of Classification Search
CPC ........ B62M 3/08; B62M 3/083; B62M 3/086; Y10T 74/2172
See application file for complete search history.

(56) References Cited

U.S. PATENT DOCUMENTS

| 6,564,676 | B2 | 5/2003 | Bezet |
| 7,174,807 | B2 * | 2/2007 | Bryne .................... B62M 3/086 36/131 |
| 8,065,933 | B2 | 11/2011 | Coderre |
| 2009/0151509 | A1 | 6/2009 | French |

FOREIGN PATENT DOCUMENTS

| JP | 01275296 A | * 11/1989 | .............. B62M 3/08 |
| WO | 2014/053053 | 4/2014 | |

* cited by examiner

Primary Examiner — Thomas C Diaz
(74) Attorney, Agent, or Firm — Tutunjian & Bitetto, P.C.

(57) ABSTRACT

A bicycle pedal, including a pedal body rotationally connected to a spindle assembly suitable to be coupled to a pedal crank, the pedal body having a central portion including a cylindrical seat in which the spindle assembly is inserted and rotatably supported. The pedal includes a plurality of spacers, inserted along the spindle assembly and/or inside the cylindrical seat, suitable to be relocated in order to modify the Q-factor of the pedal.

12 Claims, 6 Drawing Sheets

BICYCLE PEDAL

TECHNICAL FIELD OF THE INVENTION

The present invention relates to a bicycle pedal.

STATE OF THE ART

Bicycle pedals normally comprise a cartridge spindle assembly, for mounting on a pedal crank, comprising a spindle, rings, rolling bearings, etc., and on which the pedal body is mounted such that it can rotate.

Pedals are generally constructed with a fixed "Q-factor" which is the distance from the centerline of the cleat mount to the bicycle crank arm, or more generally the distance between the centers of the rider's feet.

A fixed Q-factor is not ideal for all riders, as some riders can gain comfort, efficiency, or joint longevity by fine tuning their Q-factor.

Some riders want to minimize their Q-factor as much as possible, while others may require a wider Q-factor, or have other physiological reasons for a particular Q-factor.

Presently, available solutions for Q factor adjustment are inadequate or have significant disadvantages.

For example, some known solutions foresee the provision of different length spindles.

Offering different length spindles is actually too expensive: in addition, such spindles are only available in broad increments, such as 5 or 10 mm.

In other solutions, such as the one disclosed in U.S. Pat. No. 8,065,933, the pedal body can be located in different positions along the cartridge spindle assembly.

Such solutions have the significant disadvantage of increased complexity and decreased strength.

Some other known pedals offer a small range of Q factor adjustment by placing one or two washers between the spindle and the crank arm, but this range is extremely limited.

The pedal disclosed in U.S. Pat. No. 6,564,676 has an adjustable Q-factor, but it is complex, heavy, expensive to manufacture, and has an extremely high stack height, where the stack height is the distance from the centerline of the pedal spindle to the bottom of the shoe sole, and generally the stack height is preferred to be as small as possible.

Being that people have very limited power output, efficiency on a bike is important.

How a person fits the bicycle is extremely important for efficiency, comfort, and physical durability for joints, ligaments and so on.

It has become increasingly common for riders to hire professional bike fitters to help determine all the various fit parameters including the bicycle frame, stem, handlebars, saddle, seat post, crank arms and pedals.

In current pedals, the only way to modify the Q-factor is to replace the spindle with a longer or shorter spindle, but this solution is expensive and cumbersome, and it is only available in wide differences such as every 5 millimeters.

SUMMARY OF THE INVENTION

The technical aim of the present invention is therefore to improve the state of the art.

Within such technical aim it is an object of the invention to develop a bicycle pedal provided with an integrated, finely incremented, Q-factor adjustment.

Another object of the invention is to propose a bicycle pedal having reduced weight.

A further object of the invention is to develop a bicycle pedal having a simplified structure.

Still another object of the present invention is to provide a bicycle pedal having a low stack height for biomechanical reasons.

This aim and these objects are all achieved by the bicycle pedal according to the present principles.

The bicycle pedal according to the invention comprises a pedal body rotationally connected to a spindle assembly, suitable to be coupled to a pedal crank.

The pedal body having a central portion comprising a cylindrical seat in which the spindle assembly is inserted and rotatably supported.

According to the invention, the pedal comprises a plurality of spacers, inserted along the spindle assembly and/or inside the cylindrical seat, suitable to be relocated in order to modify the Q-factor of the pedal.

The present specification and claims refer to preferred and advantageous embodiments of the invention.

BRIEF DESCRIPTION OF THE DRAWINGS

These and other advantages will be better understood by any man skilled in the art from the following description that follows and from the attached drawings, given as a non-limiting example, in which.

DETAILED DESCRIPTION OF THE INVENTION

Figure 1:
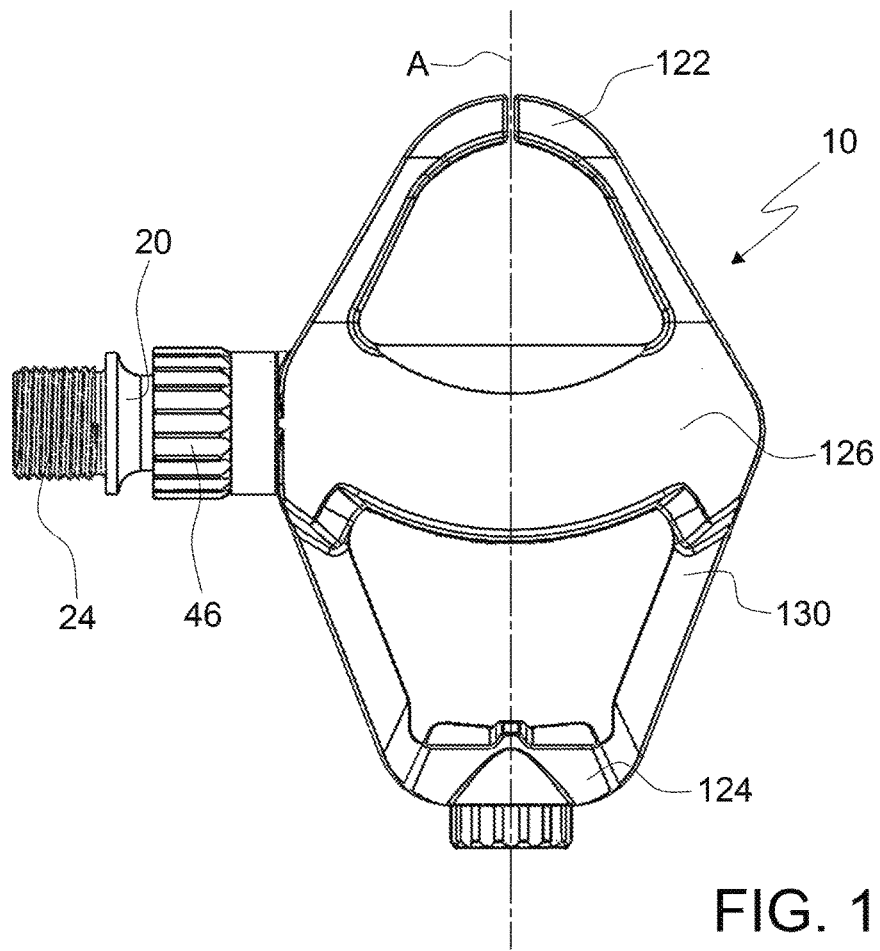
FIG. 1 is a top view of the pedal according to the invention.
Figure 2:
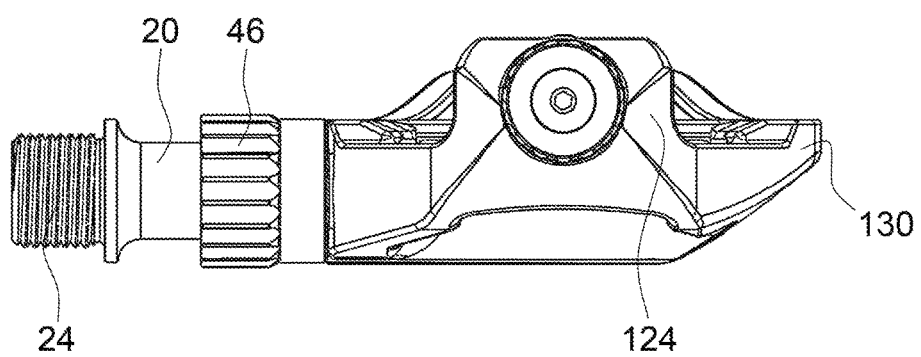
FIG. 2 is a rear view of the pedal.
Figure 3:
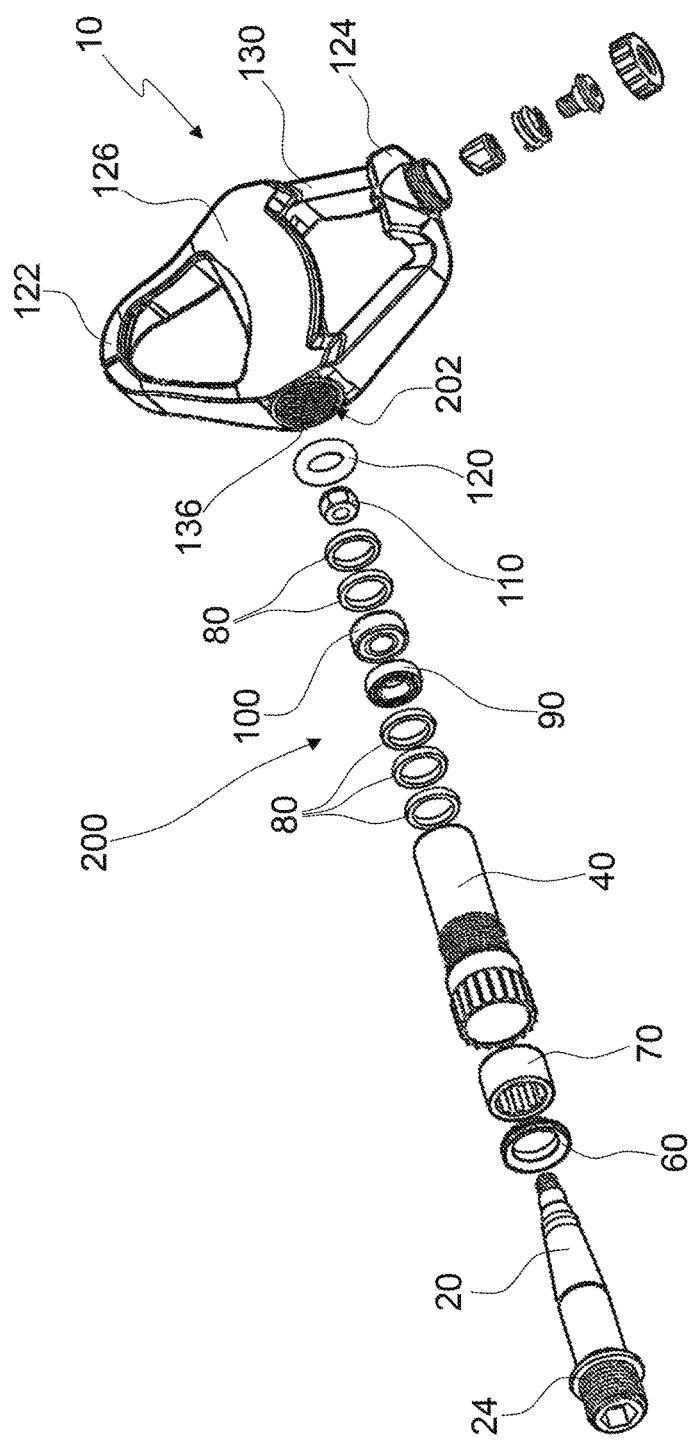
FIG. 3 is an exploded view of the pedal.
Figure 4:
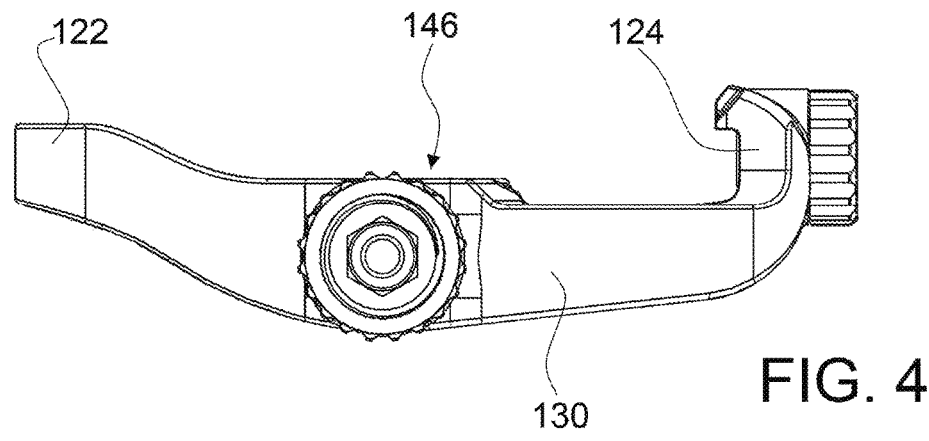
FIG. 4 is a side view of the pedal.

With reference to the schematic representation of FIG. 1, a bicycle pedal according to the invention is wholly indicated with 10.

In the following embodiments individual characteristics, given in connection with specific embodiments, may actually be interchanged with other different characteristics that exist in other embodiments.

The pedal according to the present invention can be easily installed on bicycles of any kind; preferably, but not exclusively, the pedal according to the invention is installed on road bicycles and the like.

The pedal according to the invention can be of the automatic type or of the platform type, with no limitations.

The pedal 10 comprises a pedal body 130.

The pedal body 130 is rotationally connected to a spindle 20; the spindle 20 suitable to be coupled to a pedal crank.

The spindle's 20 shape shown is smooth and tapered over the majority of the length, in order to minimize stress risers.

Spindle 20 can be made of titanium, or other suitable material.

The pedal body 130 can be made from any material suitable for the application.

For example, it can be made of polymeric material.

One preferred material could be a carbon reinforced polymer.

The pedal body 130 has, or defines, a front-rear direction A.

The pedal body 130 comprises a front portion 122 and a rear portion 124.

The pedal body 130 further comprises a central portion 126.

The central portion 126 defines an upper surface 142.

The upper surface is suitable to contact a cleat connected to the user's shoe sole.

Such cleat is not shown in the figures as it is not part of the present invention.

The front portion 122 and the rear portion 124 comprise respective front and rear engagement means for the front and rear hook of the cleat.

Such engagement means could be any suitable for the application, and they are not described in detail since they are not part of the present invention.

The shape and dimensions of the pedal body 130—in particular the shape and dimensions of the front portion 122, rear portion 124, central portion 126—could be any, in order to satisfy specific user's requirements, with no limitations to the technical aims of the present invention.

The spindle 20 comprises a threaded extremity 24 for connection to the crank arm.

The spindle 20 is connected to the pedal body 130 by means of a spindle assembly 200.

More in detail, the spindle 20 is included in the spindle assembly 200.

Figure 8:
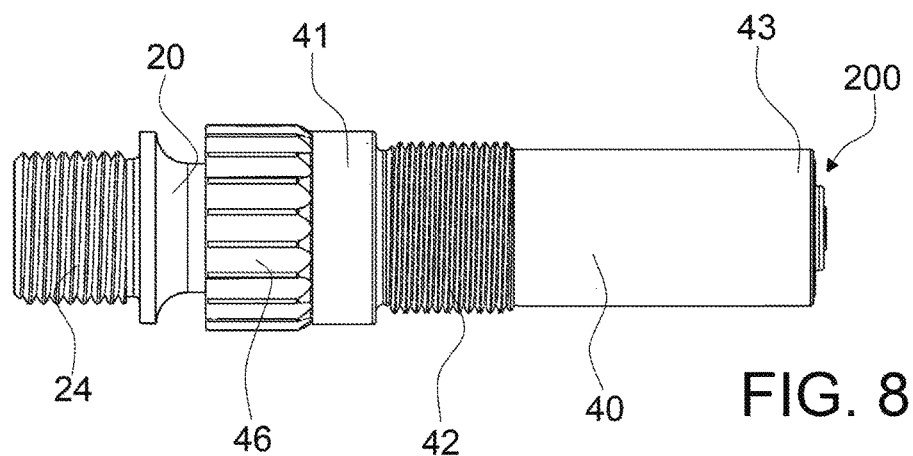
FIG. 8 is a top view of the cartridge assembly of the pedal.
Figure 9:
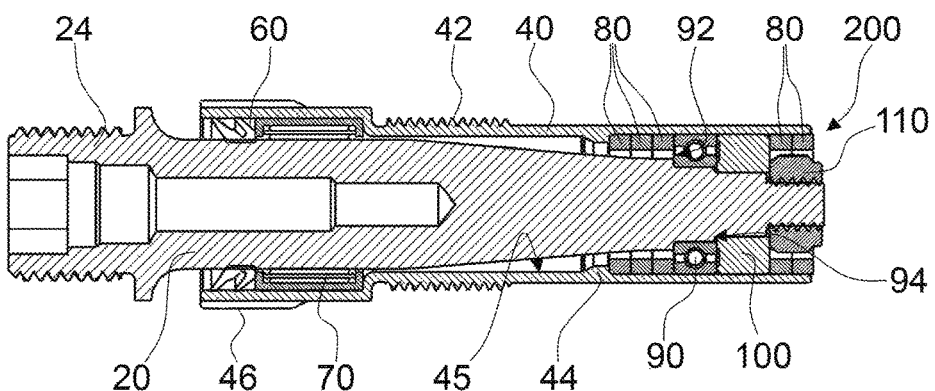
FIG. 9 is a sectional view of the spindle cartridge of the pedal with the Q-factor in a mid position.

The spindle assembly 200 is shown in detail in FIGS. 8, 9.

The spindle assembly 200 is housed inside a cylindrical seat 202.

The cylindrical seat 202 is provided in the central portion 126 of the pedal body 130.

The cylindrical seat 202 comprises a threaded end 136.

The cylindrical seat 202 further comprises an inner terminal abutment surface 203 for the spindle assembly 200.

The inner terminal abutment surface 203 is integral with the pedal body 130.

The spindle assembly 200 comprises a cartridge body 40.

The cartridge body 40 has substantially tubular shape, and it comprises a first end 41 and a second end 43.

The cartridge body 40 can be made of aluminum, or any other suitable material.

The first end 41 comprises a spline 46.

Between the first end 41 and a second end 43 a thread portion 42 is foreseen.

The thread portion 42 is screwed in the threaded end 136 of the cylindrical seat 202, in order to safely connect the cartridge body 40 to the central portion 126 of the pedal body 130.

The spline 46 allows the cartridge body 40 to be easily screwed into the pedal body 130, for example by means of an adjustment tool 300 which will be better disclosed hereafter.

The spindle assembly 200 comprises a first bearing 70.

The first bearing 70 rotationally supports the spindle 20 by a first end of the cartridge body 40.

The first bearing 70 is of the needle type.

A first bearing 70 of the needle type is preferred for strength and durability; in other embodiments of the invention, the first bearing 70 could be replaced by a bushing.

A seal 60 abuts onto the first bearing 70, and it closes the cartridge body 40 opening, preventing contamination from entering the cartridge body 40 itself.

The spindle 20 is rotationally supported, by a second end of the cartridge body 40, by a second bearing 90 and by a third bearing 100.

Two bearings 90,100 are preferred for strength and durability: however they could be replaced by a single bearing or bushing.

The first and second bearing 90,100 are arranged on respective abutments 92,94 foreseen in the spindle 20.

The first and second bearing 90,100 are held by a nut 110.

The nut 110 is screwed onto the threaded end of the spindle 20.

Into the cylindrical seat 202 an O-ring seal 120 is housed, on which the second end 43 of the cartridge body 40 abuts.

The inner surface 45 of the cartridge body 40 comprises a lip 44.

The lip 44 is opposite to the inner terminal abutment surface 203.

According to an aspect of the present invention, the pedal 10 comprises a plurality of spacers 80.

According to the invention, as better disclosed hereafter, the number of spacers 80 foreseen in the pedal 10 corresponds to the number of different axial positions of the spindle 20 relative to the cartridge body 40 which can be selected by the user: in other words, the number of spacers 80 foreseen in the pedal 10 corresponds to the number of possible Q-factor adjustments selectable by the user.

More in detail, according to an aspect of the present invention, the spacers 80 can be relocated within the cylindrical seat 202, and more in detail within the spindle assembly 200, in order to modify the Q-factor of the pedal 10.

In the embodiment of the invention shown in the figures, the spacers 80 foreseen in the pedal 10 are in number of five; in other embodiments of the invention, the number of spacers 80 could be any, in order to satisfy specific Q-factor adjustment requirements.

Figure 5:
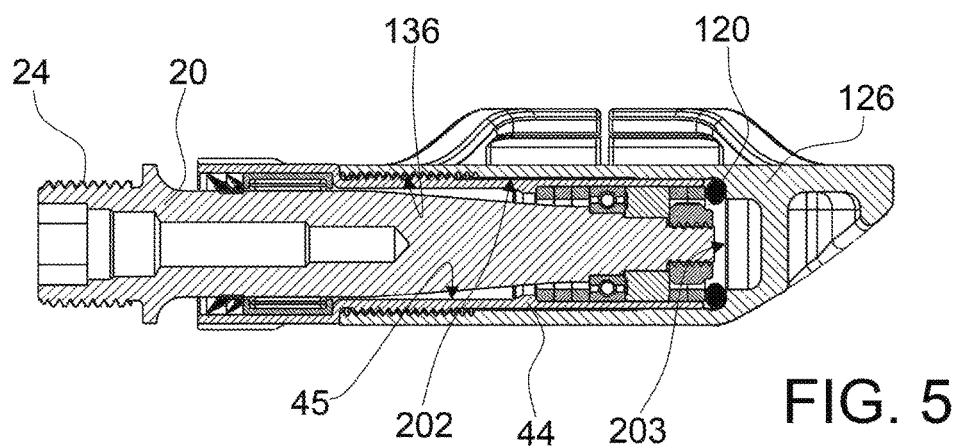
FIG. 5 is a sectional view of the pedal with the spindle cartridge installed with the Q-factor in a mid position.

FIG. 5 shows a sectional view of the pedal 10 with the spindle assembly 200 installed with the Q-factor in a mid position.

In this configuration, the spacers 80 are interposed between the lip 44 and the second bearing 90, and between the third bearing 100 and the O-ring seal 120, which in turn contacts the inner terminal abutment surface 203.

More in particular, three spacers 80 are interposed between the lip 44 and the second bearing 90, while two spacers 80 are interposed between the third bearing 100 and the O-ring seal 120.

Figure 6:
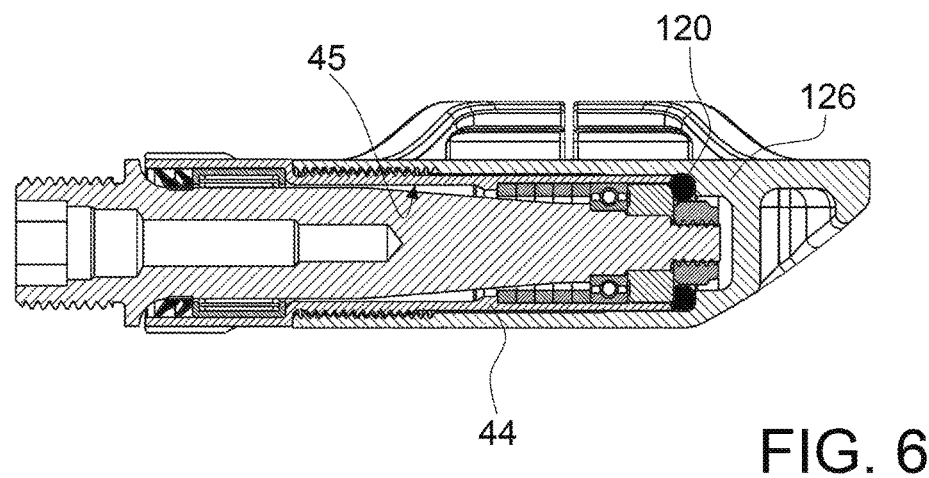
FIG. 6 is a sectional view of the pedal with the spindle cartridge installed with the Q-factor in the minimized position.

FIG. 6 shows a sectional view of the pedal 10 with the spindle assembly 200 installed with the Q-factor in the minimized position.

In this configuration, all the five spacers 80 are interposed between the lip 44 and the second bearing 90.

As it can be seen, in this configuration the spindle 20 is fully inserted inside the cartridge body 40, therefore the distance between the threaded extremity 24 of the spindle 20 and the front-rear direction A of the pedal 10—or any other suitable reference distance chosen by the user—is minimized.

Figure 7:
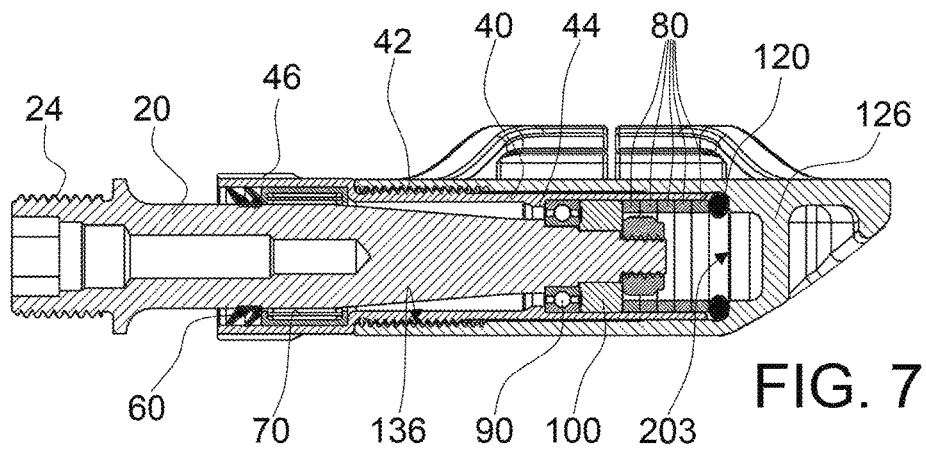
FIG. 7 is a sectional view of the pedal with the spindle cartridge installed with the Q-factor in the maximized position.

FIG. 7 shows a sectional view of the pedal 10 with the spindle assembly 200 installed with the Q-factor in the maximized position.

In this configuration, all the five spacers 80 are interposed between the third bearing 100 and the O-ring seal 120, which in turn contacts the inner terminal abutment surface 203.

The spindle 20 is fully protruding from the cartridge body 40, therefore the distance between the threaded extremity 24 of the spindle 20 and the front-rear direction A of the pedal 10—or any other suitable reference distance chosen by the user—is maximized.

The spacers 80 can be made of aluminum, or any other suitable material.

The thickness of the spacers 80 can be any, for example 1 mm or 2 mm.

According to another aspect of the present invention, other intermediate positions of the spindle 20 relative to the cartridge assembly 40 can be achieved by simply removing the cartridge body 40 from the cylindrical seat 202, and the nut 110 from the threaded end of the spindle 20.

More in detail, the cartridge body 40 can be removed from the cylindrical seat 202 by operating the spindle 46 with a suitable tool.

After removing the cartridge body 40 from the cylindrical seat 202, the spindle 20 can be removed from the cartridge body 40 by unscrewing the nut 110, allowing therefore the second bearing 90 and third bearing 100 to be removed from the spindle 20.

At this point, the spacers 80 can be relocated in order to achieve the desired Q-factor.

For example, in order to achieve the intermediate Q-factor position shown in FIG. 5, the user inserts three spacers 80 along the spindle 20; therefore, the second bearing 90 and the third bearing 100 are inserted along the spindle 20, until the outer race of the second bearing 90 contacts the outermost spacer 80.

The second bearing 90 and the third bearing 100 are therefore locked by the nut 110, bringing the innermost spacer 80 into contact with the lip 44 of the cartridge body 40.

After that, the two remaining spacers 80 are inserted into the opening of the cartridge body 40.

The cartridge body 40 can be finally screwed into the cylindrical seat 202, bringing the outermost spacer 80 into contact with the O-ring seal 120.

In order to achieve the minimum Q-factor configuration shown in FIG. 6—starting for example from the configuration of FIG. 5—after removal of nut 110, bearings 90,100 and spacers 80, the user inserts all five spacers 80 along the spindle 20, and after that he inserts the bearings 90,100 and screws the nut 110.

In order to achieve the maximum Q-factor configuration of FIG. 7—starting for example from the configuration of FIG. 5—after removal of nut 110 bearings 90,100 and spacers 80, the user inserts the bearings 90,100 along the spindle 20 and screws the nut 110, and after that he inserts all spacers 80 inside the cartridge body 40, since the external diameter of the spacers 80 fits exactly the internal diameter of the cartridge body 40 itself.

The Q-factor adjustment system according to the present invention is simple and strong.

When using aluminum spacers the weight increase, with respect to known pedals, is negligible.

The rider can change his Q-factor at any time, since all the components are always contained within the pedal.

The Q-factor can be easily adjusted in fine increments and without the need to purchase any external component.

The pedal according to the invention has a low stack height, which is advisable from a biomechanical point of view.

Figure 11:
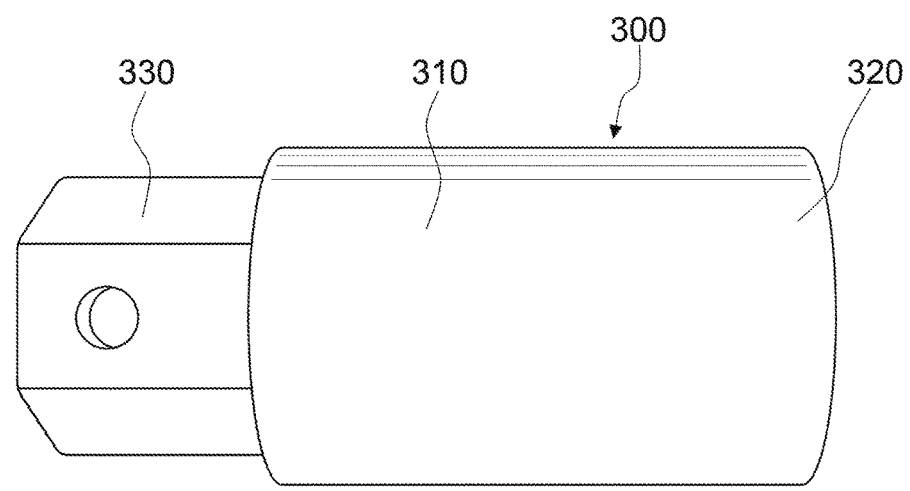
FIG. 11 is a side view of and adjustment tool of the Q-factor of the pedal according to the invention.
Figure 12:
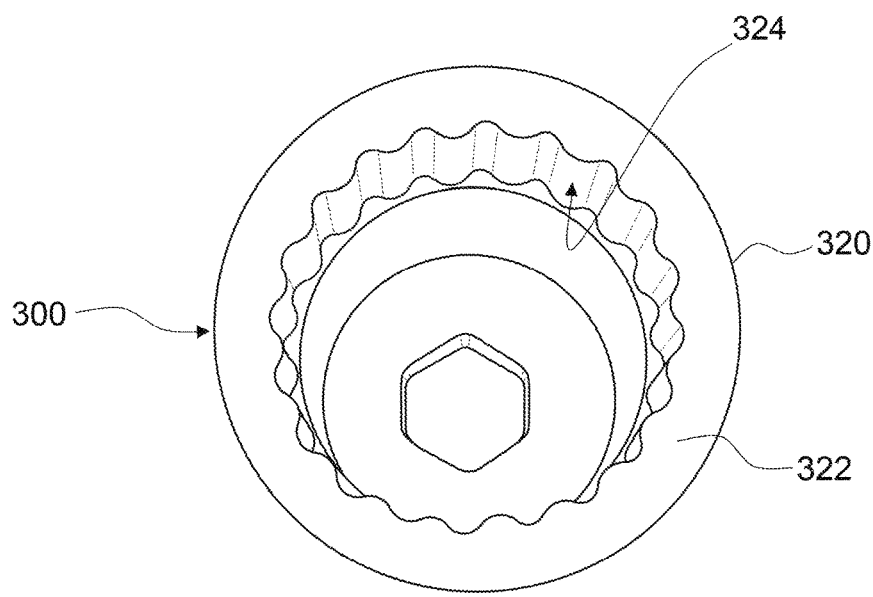
FIG. 12 is a top view of the tool.
Figure 13:
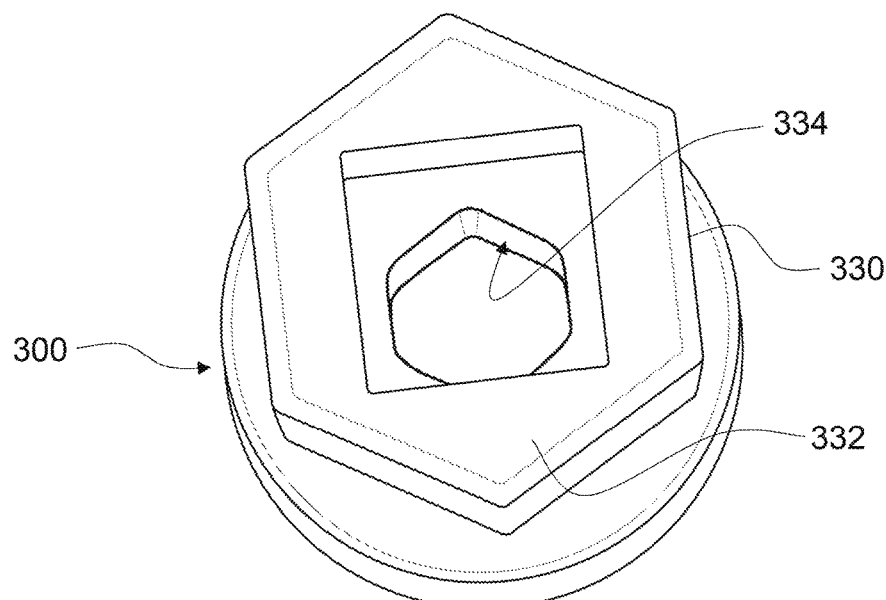
FIG. 13 is a bottom view of the tool.

In FIGS. 11-13 a tool 300 is shown which is suitable to quickly and easily adjust the Q-factor of the pedal according to the present invention.

In particular, the tool 300 allows the user operating both the spline 46—in order to unscrew the cartridge body 40 from the cylindrical seat 202—and the nut 110, in order to remove and relocate the bearings 90,100 and the spacers 80.

The tool 300 comprises a tool body 310.

The tool body 310 is substantially cylindrical.

The tool body 310 comprises a first extremity 320 suitable to operate the spline 46.

The tool body 310 further comprises a second extremity 330, opposite to the first extremity, suitable to operate the nut 110.

More in detail, the first extremity 320 comprises a first wrench 322 having a first internal surface 324 mating the external shape of the spline 46.

Similarly, the second extremity 330 comprises a second wrench 332 having a second internal surface 334 mating the external shape of the nut 110, i.e. it has hexagonal shape.

The tool 300 is particularly practical and comfortable since it allows performing the complete adjustment of the Q-factor of the pedal 10 without the need to use two ore more common wrenches.

Furthermore, the tool 300 is very compact and therefore it can be easily carried by the rider.

Figure 10:
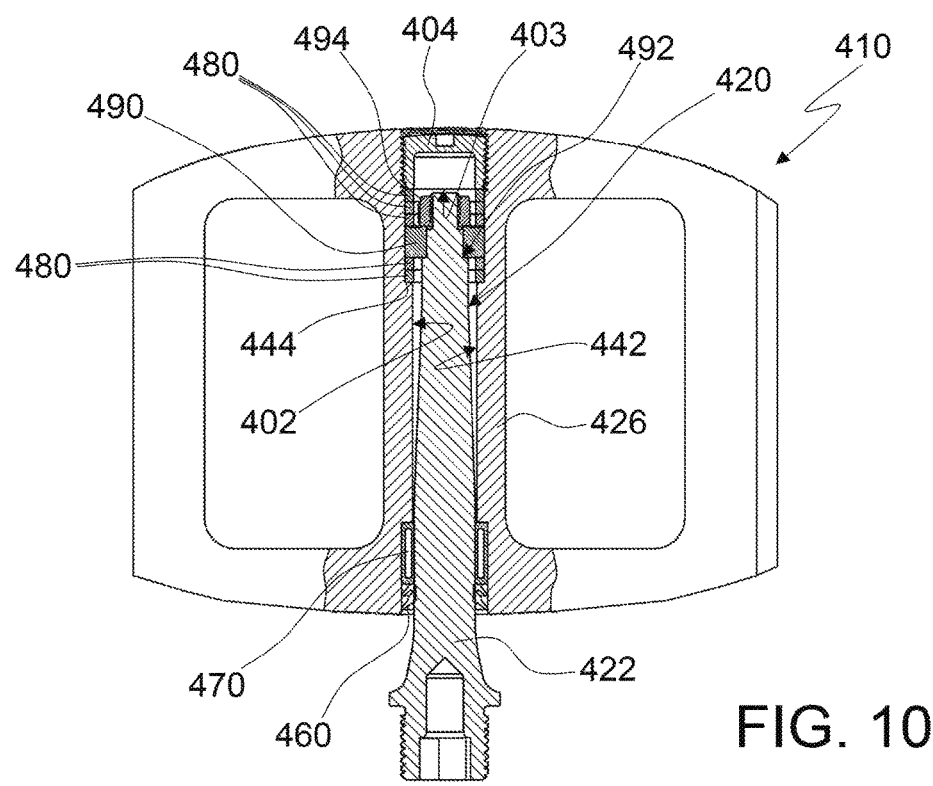
FIG. 10 is a top view of another embodiment of the pedal according to the invention.

Another embodiment of the invention is shown in FIG. 10.

This embodiment of the invention is characterized by a simplified construction in which the cartridge assembly disclosed in the previous embodiment is absent.

More in detail, the pedal 410 comprises a pedal body 430.

The pedal body 430 comprises a central portion 426 defining a passing cylindrical seat 402, in which a spindle assembly 420 is directly inserted.

The spindle assembly 420 comprises a spindle 422.

The spindle assembly 420 comprises a first bearing 470 supporting the spindle 422 inside the cylindrical seat 402 by a first extremity, i.e. the extremity which is closer to the crank arm.

The first bearing 470 is, for example, of the needle type.

The opening of the cylindrical seat 402 is closed by a seal 460.

The spindle assembly 420 further comprises a second bearing 490 supporting the spindle 420 inside the cylindrical seat 402 by a second extremity, i.e. the extremity which is farther from the crank arm.

The second bearing 490 contacts an abutment 492 foreseen in the spindle 422, and it is locked in position by a nut 494.

The cylindrical seat 402 of the pedal body 410 is closed, by the extremity which is farther from the crank arm, by an inner terminal abutment surface 403, comprising in particular an end cap 404.

The internal surface 442 of the cylindrical seat 402 comprises a lip 444.

The lip 444 is opposite to the inner terminal abutment surface 403.

The pedal 410, according to the invention, comprises five spacers 480.

The number of spacers 480 could be any according to specific user's requirements.

The spacers 480 are similar, or identical, to those disclosed in the previous embodiment of the invention.

The five spacers 480 are inserted along the spindle 420 according to different arrangements, in order to achieve different Q-factors of the pedal 410.

For example, in the configuration shown in FIG. 10, two of the five spacers 480 are interposed between the lip 444 and the second bearing 490, while the other three are interposed between the second bearing 490 and the internal abutment surface 403 of the end cap 404.

The configuration shown in FIG. 10 is therefore suitable to achieve a mid value of the Q-factor.

The minimum and maximum Q-factor configurations are similar to those shown in FIGS. 6, 7 regarding the previous embodiment of the invention.

The present embodiment is simpler and cheaper than the previous one, which on the contrary is characterized by easier adjustment of the Q-factor.

The present invention has been described according to preferred embodiments, but equivalent variants can be devised without departing from the scope of protection offered by the following claims.

The invention claimed is:

1. A bicycle pedal, comprising a pedal body rotationally connected to a spindle assembly suitable to be coupled to a pedal crank, said pedal body having a central portion comprising a cylindrical seat in which said spindle assembly is inserted and rotatably supported, wherein said pedal comprises a plurality of spacers, inserted along the spindle assembly and/or inside the cylindrical seat, and able to be relocated within the spindle assembly in order to modify the Q-factor of the pedal,
   wherein said cylindrical seat comprises a lip and an inner terminal abutment surface opposite to said lip, said lip and/or said inner terminal abutment surface being suitable to contact one of said spacers,
   wherein said spindle assembly comprises a spindle rotatably supported at least on a first bearing, on a second bearing and on a third bearing, said spacers being insertable along said spindle interposed between said lip and said second bearing and/or between said third bearing and said inner terminal abutment surface, and
   wherein said pedal comprises a cartridge body housing said spindle, said cartridge body having a threaded portion screwed in a threaded end of said cylindrical seat.

2. The pedal according to claim 1, wherein said inner terminal abutment surface comprises an end cap closing said cylindrical seat.

3. The pedal according to claim 1, wherein said inner terminal abutment surface is integral with said pedal body.

4. The pedal according to claim 3, comprising at least an O-ring seal contacting said inner terminal abutment surface.

5. The pedal according to claim 1, wherein said first bearing is of the needle type.

6. The pedal according to claim 1, wherein said spindle assembly comprises a nut screwed onto the threaded end of said spindle, said nut being suitable to lock said second bearing or a third bearing.

7. The pedal according to claim 1, wherein said cartridge body comprises a first end provided with a spline suitable to be operated in order to screw/unscrew said catridge body into/from said cylindrical seat.

8. The pedal according to claim 1, wherein said second bearing and said third bearing contact respective abutments foreseen along said spindle.

9. The pedal according to claim 1, wherein said spacers are made of aluminum.

10. The pedal according to claim 1, wherein said spacers are 1 mm or 2 mm thick.

11. A bicycle pedal, comprising a pedal body rotationally connected to a spindle assembly suitable to be coupled to a pedal crank, said pedal body having a central portion comprising a cylindrical seat in which said spindle assembly is inserted and rotatably supported, wherein said pedal comprises a plurality of spacers, inserted along the spindle assembly and/or inside the cylindrical seat, and able to be relocated within the spindle assembly in order to modify the Q-factor of the pedal,
   wherein said cylindrical seat comprises a lip and an inner terminal abutment surface opposite to said lip, said lip and/or said inner terminal abutment surface being suitable to contact one of said spacers, and
   wherein a number of spacers foreseen in the pedal corresponds to a number of possible Q-factor adjustments selectable by a user.

12. A bicycle pedal, comprising a pedal body rotationally connected to a spindle assembly suitable to be coupled to a pedal crank, said pedal body having a central portion comprising a cylindrical seat in which said spindle assembly is inserted and rotatably supported, wherein said pedal comprises a plurality of spacers, inserted along the spindle assembly and/or inside the cylindrical seat, and able to be relocated within the spindle assembly in order to modify the Q-factor of the pedal
   wherein said cylindrical seat comprises a lip and an inner terminal abutment surface opposite to said lip, said lip and/or said inner terminal abutment surface being suitable to contact one of said spacers
   wherein the plurality of spacers, are relocated within the spindle assembly by arranging different numbers of said plurality of spacers in different positions along the spindle assembly.

* * * * *